July 27, 1943.  E. H. LOKER  2,325,257
MILK STRAINER
Filed July 25, 1942
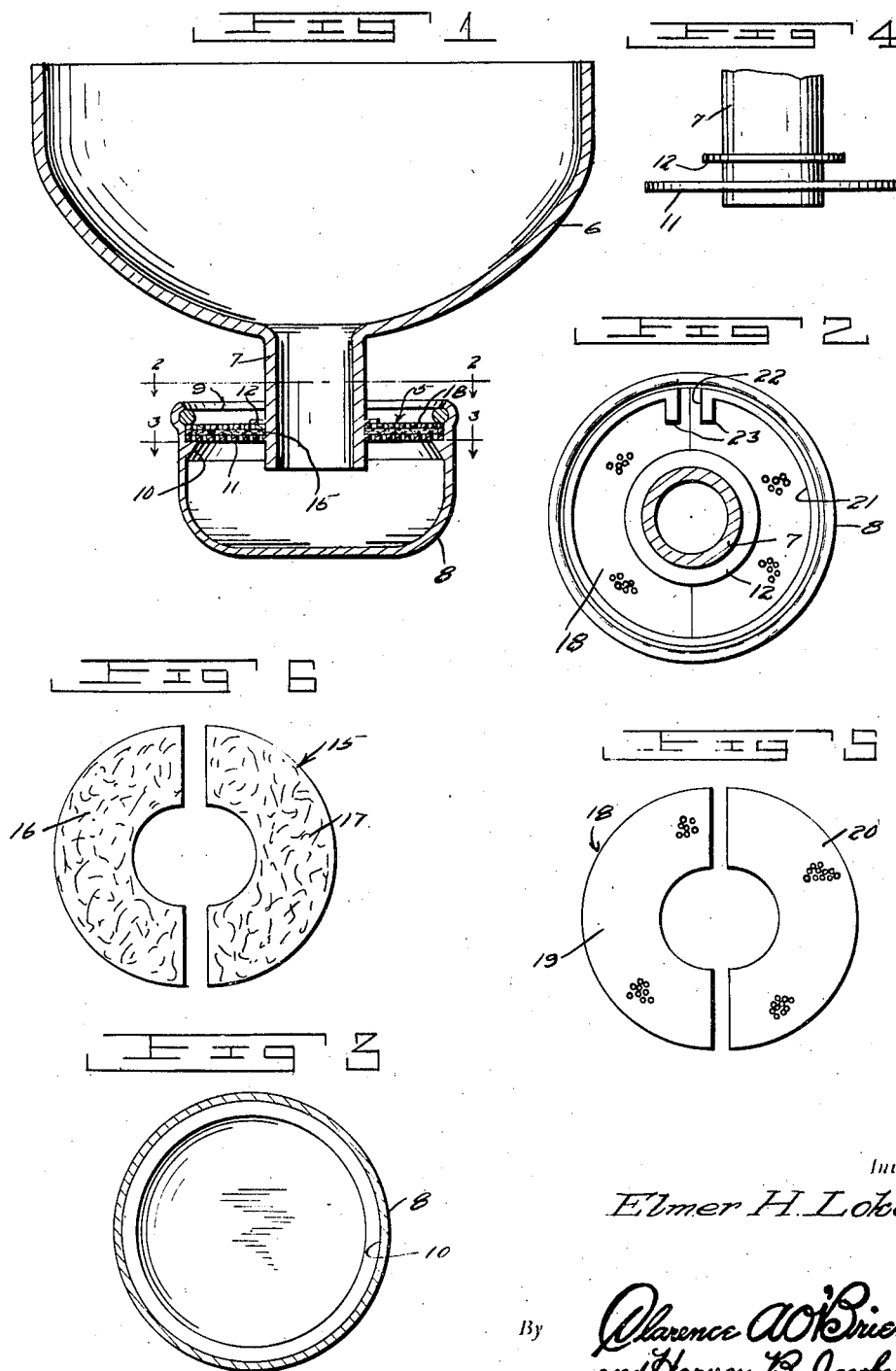
Inventor
Elmer H. Loker
By Clarence A. O'Brien
and Harvey B. Jacobson
Attorneys Patented July 27, 1943

2,325,257

UNITED STATES PATENT OFFICE 2,325,257

MILK STRAINER

Elmer H. Loker, Sergeant Bluff, Iowa

Application July 25, 1942, Serial No. 452,345

1 Claim. (Cl. 210—157)

The invention relates to an improved strainer for use with milk cans, the primary object of the invention being to provide an efficient strainer for this use wherein the dirt strained from the milk is not forced through the straining element into the milk or caused to accumulate in the straining medium.

Other important objects and advantages of the invention will be apparent from a reading of the following description taken in connection with the appended drawing, wherein for purposes of illustration a preferred embodiment of the invention is shown.

In the drawing—

Figure 1 is a general transverse vertical sectional view taken through the embodiment.

Figure 2 is a horizontal sectional view taken through Figure 1 along the line 2—2 and looking downwardly in the direction of the arrows.

Figure 3 is a horizontal sectional view taken through Figure 1 along the line 3—3 and looking downwardly in the direction of the arrows.

Figure 4 is a fragmentary side elevational view of the neck of the bowl.

Figure 5 is a top plan view of one of the sectional perforated disks, and

Figure 6 is a top plan view of the sectional filter pad.

Referring in detail to the drawing, the numeral 5 generally designates the improved milk strainer which consists of a milk receiving bowl 6 having a depending reduced neck 7 which empties into a sediment trap and container 8 which surrounds the open lower end of the neck 7 and is supportably connected thereto.

The sediment trap and container 8 is in the form of a bowl with an inturned lip 9 at its upper end. Spaced below the lip 9 is a ledge 10 which runs around the interior of the trap 8.

Resting upon the ledge 10 is a perforated disk 11 formed integrally on the neck 7 and spaced above the disk and also integrally formed on the neck is a flange 12. Upon the disk 11 rests the sectional filter pad which is generally designated 15 and is composed of the similar generally semi-circular sections 16 and 17 whose inner edges engage and grasp the sides of the depending neck 7. Upon the filter pad 15 rests the sectional upper perforated plate 18 which is composed of duplicate semi-circular sections 19 and 20 similar to the filter pad, the plate 18 being disposed immediately under the flange 12. A spring ring which is generally designated 21 and may suitably be formed of stout wire is broken at the point 22 where the ends of the wire have inwardly directed terminals 23. The diameter of the ring 21 is larger than that of the container 8 so that when it is contracted and snapped under the overhanging lip 9 it will expand and forcibly engage under the lip and compress the upper perforated plate 18 down upon the pad 15 and the lower perforated disk 11, thereby assembling the plates and the filter pad in mutually compressed relation on the ledge 10.

It will be observed that as the milk is introduced into the receiving bowl 6 it flows downwardly through the depending neck 7 and into the trap 8 and that in so doing the milk does not forcibly impinge upon the filtering or straining element as is ordinarily the case. Instead the milk rises and passes upwardly through the filtering or straining element composed of the perforated disks and filter pad described in a gentle flow and after passing through the filtering or straining element flows into the milk can (not shown). It will also be observed that the heavier particles of the milk have a tendency to fall gravitationally into the bottom of the trap as the milk rises to pass through the filter or strainer element. In addition, such particles as may collect at the bottom of the filter element have a natural tendency to fall therefrom and fail to become lodged in the filter element, so that the filter element is clear of obstruction at all times.

Although there is shown and described herein a preferred embodiment of the invention it is to be understood that it is not desired to limit the application of the invention thereto except as may be required by the scope of the subjoined claim.

Having described the invention, what is claimed as new is:

A strainer of the class described comprising a receiving bowl having a depending neck, a perforated disk integrally formed on said neck, a flange integrally formed on the neck above the disk, a strainer element removably secured on the neck between the disk and the flange, a container having an inturned lip and an internal shoulder below the lip, and a split ring compressed under said lip of the container and clamping the strainer element and disk on said shoulder.

ELMER H. LOKER.